(12) United States Patent
Hinterberger et al.

(10) Patent No.: US 11,054,713 B2
(45) Date of Patent: Jul. 6, 2021

(54) METHOD FOR CONTROLLING AN ASSEMBLY COMPRISING MULTIPLE SWITCHABLE ELECTROCHROMIC INDIVIDUAL PANES AND ALSO CONTROL DEVICE AND MOTOR VEHICLE

(71) Applicant: Continental Automotive GmbH, Hannover (DE)

(72) Inventors: Rene Hinterberger, Vienna (AT); Peter Gubesch, Vienna (AT); Tobias Frischmuth, Vienna (AT); Johannes Greil, Vienna (AT); Andreas Egger, Gross-Enzersdorf (AT)

(73) Assignee: Continental Automotive GmbH, Hannover (DE)

( * ) Notice: Subject to any disclaimer, the term of this patent is extended or adjusted under 35 U.S.C. 154(b) by 139 days.

(21) Appl. No.: 16/051,949

(22) Filed: Aug. 1, 2018

(65) Prior Publication Data

US 2019/0041715 A1 Feb. 7, 2019

(30) Foreign Application Priority Data

Aug. 1, 2017 (DE) ..................... 10 2017 213 296.5

(51) Int. Cl.
*G02F 1/163* (2006.01)
*G02F 1/17* (2019.01)
(Continued)

(52) U.S. Cl.
CPC ............... *G02F 1/163* (2013.01); *B60J 3/04* (2013.01); *G01K 7/16* (2013.01); *G01K 7/343* (2013.01);
(Continued)

(58) Field of Classification Search
CPC ... G02F 1/01; G02F 1/15; G02F 1/163; G02F 1/172; B60J 3/04; G01K 7/16; G01K 7/343; G01L 2217/00
See application file for complete search history.

(56) References Cited

U.S. PATENT DOCUMENTS 7,133,181 B2 11/2006 Greer
8,004,739 B2 * 8/2011 Letocart .................. G02F 1/163
359/265
(Continued)

FOREIGN PATENT DOCUMENTS

CN 105372898 A 3/2016
CN 105957467 A 9/2016
(Continued)

OTHER PUBLICATIONS

Office Action dated Mar. 29, 2018 from corresponding German Patent Application No. 10 2017 213 296.5.

*Primary Examiner* — Ephrem Z Mebrahtu

(57) ABSTRACT

The disclosure relates to a method for controlling an assembly comprising multiple switchable electrochromic individual panes, to set a transmittance individually in each case for these by a respective electrical actuation signal, wherein respective data of the state at the time of each individual pane are recorded by a control device and a configuration of the respective actuation signal is established in each case for each individual pane on the basis of the state data. The configurations of the actuation signals are thereby made to match one another in such a way that the individual panes have preferably the same transmittance value.

16 Claims, 3 Drawing Sheets

(51) Int. Cl.
*B60J 3/04* (2006.01)
*G01K 7/16* (2006.01)
*G01K 7/34* (2006.01)

(52) U.S. Cl.
CPC ......... *G02F 1/172* (2013.01); *G01K 2217/00* (2013.01)

(56) References Cited

U.S. PATENT DOCUMENTS

| | | | |
|---|---|---|---|
| 2006/0245024 A1* | 11/2006 | Greer | G02F 1/163 359/265 |
| 2007/0285759 A1* | 12/2007 | Ash | B60J 3/04 359/275 |
| 2014/0268285 A1* | 9/2014 | Chung | G02F 1/153 359/275 |
| 2016/0154290 A1* | 6/2016 | Brown | H04L 12/4625 359/275 |
| 2018/0143501 A1* | 5/2018 | Nagel | G05B 15/02 |

FOREIGN PATENT DOCUMENTS

| | | | | |
|---|---|---|---|---|
| DE | 102012013561 A1 * | 1/2014 | | B60J 1/17 |
| DE | 102012013561 A1 | 1/2014 | | |
| WO | WO-9816870 A1 * | 4/1998 | | G02F 1/163 |

\* cited by examiner

METHOD FOR CONTROLLING AN ASSEMBLY COMPRISING MULTIPLE SWITCHABLE ELECTROCHROMIC INDIVIDUAL PANES AND ALSO CONTROL DEVICE AND MOTOR VEHICLE

BRIEF DESCRIPTION OF THE DRAWINGS

Exemplary embodiments are described below. In this regard, in the figures.

DETAILED DESCRIPTION

Figure 1:
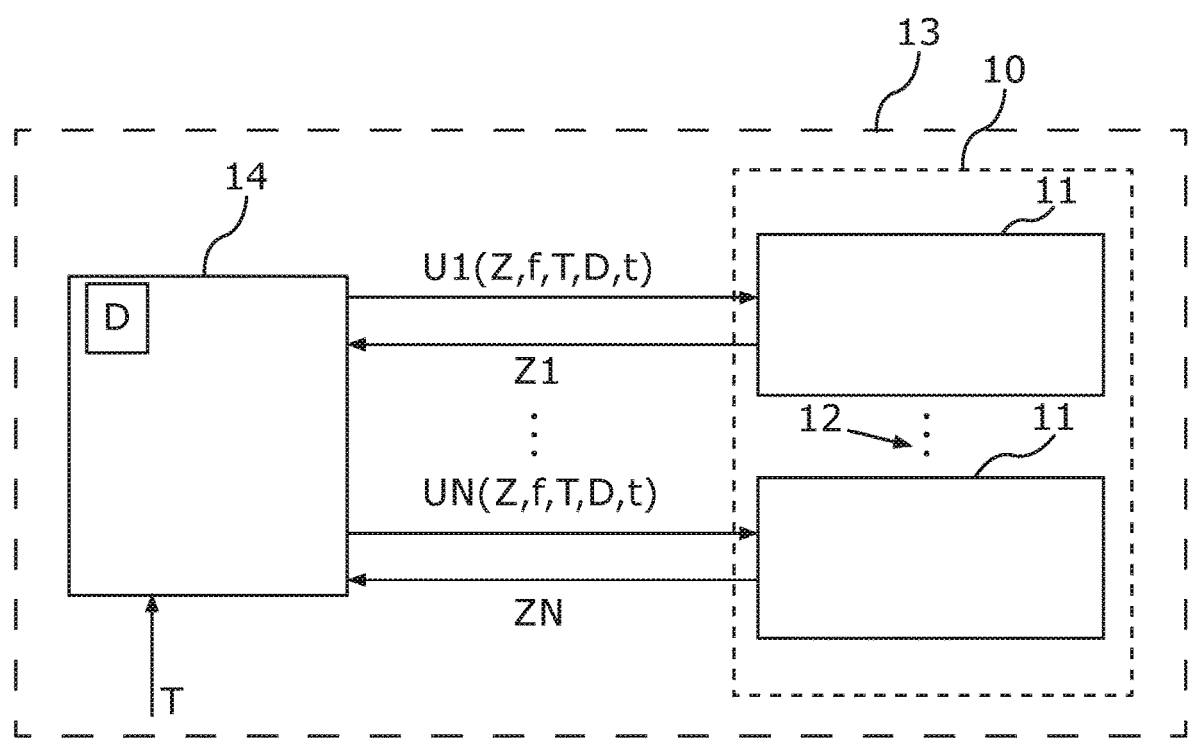
FIG. 1 shows a schematic representation of an assembly comprising individual panes and a control device for switching the individual panes.

The disclosure relates to a method for controlling a group or an assembly comprising multiple switchable electrochromic individual panes. Each electrochromic individual pane is switchable to the extent that a light permeability or transmittance or transmissivity of the individual pane can be set individually by means of a respective electrical control signal. The disclosure also discloses a control device for carrying out the method and a motor vehicle with said assembly and also the control device.

An individual pane of an assembly represents a switchable glazing, e.g. it is a transparent pane arrangement with an electrochromic structure or matrix (ECD—Electrochromic Device) enclosed therein. Such an electrochromic matrix may be based on particles in suspension, which are aligned increasingly parallel when an electrical field is applied (SPD—Suspended Particle Device). This alignment takes place with a temperature-dependent time constant 1. With maximum parallel alignment, the maximum transmittance is obtained. In the absence of an electrical field, Brownian motion causes a chaotic alignment of the particles and the state of minimal transmittance occurs. The rate of this chaotic alignment, as well as the ultimately resultant minimal transmittance itself, are temperature-dependent.

Effects of wear or aging also have an influence on the transmittance characteristic of an individual pane. Possible aging effects are the aggregation of the particles, which prevents parallel alignment and consequently reduces the achievable maximum transmittance, a reduction of the insulating capability of the dielectric matrix of the particles, a change in the capacitance of the dielectric matrix, an increased series resistance of the transparent contact layers between which the matrix is enclosed on both sides, or a change in the properties of the medium surrounding the particles (for example a change in the viscosity or the dielectric constant).

Since it cannot be assumed that all of the individual panes of an assembly (for example in a motor vehicle) age to the same extent or have the same temperature, the same actuation signals would produce optical differences between neighbouring individual panes of the assembly. Different temperatures may be caused for example by solar radiation. A different state of aging is obtained for example whenever an individual pane is exchanged, for example after being hit by a stone, and there is consequently an as-new individual pane in an otherwise older assembly. In order to make all of the individual panes of an assembly appear with the same transmittance (that is to say optically or visually equivalent), it is therefore necessary to take into account the temperature or the state of aging individually for each individual pane.

It is known from U.S. Pat. No. 8,018,644 B2 to use for actuating an individual pane of an assembly an optical sensor which determines and signals the actual, measurable transmittance.

It is likewise known from U.S. Pat. No. 5,822,107 A when switching or changing the transmittance of an individual pane to record the transmittance value at the particular time and to adapt the actuation signal by means of a feedback control. The transmittance may be measured by means of a photoelectric cell directly or indirectly by measuring the electrical charge that is moved altogether or the electrical voltage that is present at the particular time.

The disclosure contemplates ensuring a uniform optical appearance of the individual panes of the assembly when actuating individual panes of an assembly of electrochromic individual panes.

The disclosure provides a method for controlling an assembly or an arrangement comprising multiple switchable electrochromic individual panes. By the method, a transmittance is set individually in each case for the individual panes by means of a respective electrical actuation signal. The individual panes form an assembly to the extent that the transmittance of the individual panes is set in a coordinated manner, although an individual actuation signal is generated for each individual pane. For this purpose, respective data of the state at the time of each individual pane are recorded by a control device and a configuration of the respective actuation signal is established in each case for each individual pane on the basis of the state data. The configuration may concern a frequency or a voltage value or a signal shape (e.g. sine-wave or square-wave) of the actuation signal. The configuration therefore comprises at least one signal parameter of the actuation signal. Setting of the configuration therefore takes place by setting the at least one signal parameter to the respective parameter value from the configuration.

According to the disclosure, it is in this case provided that the configurations of the actuation signals are made to match one another in such a way that the individual panes have the same transmittance value or degree of transmittance. Therefore, the same transmittance value is set for all of the individual panes independently of the respective state or the respective transmittance characteristic of each individual pane. The transmittance characteristic represents the dependence of the resultant transmittance value on the configuration used. To compensate here for differences in the transmittance characteristic, the configuration is in fact correspondingly established individually for each individual pane in such a way as to result in the same transmittance value.

The disclosure contemplates an advantage that different individual panes, which differ with respect to their state (for example aging and temperature), are nevertheless all set to the same transmittance value. For this purpose, the configuration of the respective actuation signal may be set in dependence on the state data of the respective individual pane. On the basis of the state data, for example, the transmittance characteristic at the particular time of an individual pane can be determined and, on the basis of a desired transmittance value to be set, the suitable configuration for setting the desired transmittance value can be chosen.

The disclosure also contemplates developments that provide additional advantages.

One development concerns the so-called transmittance limits. Each individual pane has two such transmittance limits, to be specific its maximum achievable maximum transmittance (operating state of the greatest clarity or transparency) and minimum transmittance (operating state of the greatest dullness or opacity). In the case of one development, the smallest maximum transmittance (worst or lowest clarity value) or the greatest minimum transmittance (most minimal dullness, worst capacity for being dulled) are determined on the basis of the state data of each individual pane. The transmittance limits at the particular time (maximum transmittance and minimum transmittance) may for example depend in the stated way on the temperature of the individual pane or the degree of aging (degree of wear). By means of a characteristic curve, the transmittance limits achievable at the time can be concluded from the state data. So if the individual pane for which the maximum transmittance is the smallest or the minimum transmittance is the greatest has been found or identified in each case, the transmittance limits that limit the assembly overall have been found, because there is at least one individual pane that cannot go above the smallest maximum transmittance and cannot go below the greatest minimum transmittance. The respective transmittance of each individual pane of the other individual panes is therefore limited to these transmittance limits by their respective configuration of their actuation signal. Therefore, the end value of each switching operation of the individual panes is limited to a transmittance value that can be provided or can be assumed by all of the individual panes. In other words, the transmittances are therefore limited to an interval from the smallest maximum transmittance to the greatest minimum transmittance.

One development provides that a change over time in the transmittance values of the individual panes is maintained during a switching operation by making the configurations match. In other words, the dynamic switching operation also takes place synchronously or uniformly or with the same gradients over time for all of the individual panes. As a result, even during the switching operation, there are preferably no differences, or optically ascertainable differences, between the individual panes.

One development provides that the state data of the individual pane indicate in each case a state of aging at the time or a state of wear at the time of the respective individual pane, determined by an analyzer of the control device. The configurations of the actuation signals are then determined on the basis of an aging model, which indicates for a given state of aging a transmittance characteristic of the individual pane. The transmittance characteristic represents the assignment of at least one signal parameter of the actuation signal (e.g. of the configuration) to the resultant transmittance of the individual pane. If the state of aging of an individual pane is thus determined, the aging model can indicate the associated transmittance characteristic. The aging model itself may in turn be designed as a table, characteristic curve or characteristic map and be determined for example on the basis of a series of tests.

The state of aging therefore represents an input value for the aging model. In order to record the state of aging, one development provides that an aging process of the respective individual pane is replicated or simulated by the analyzer, in that, for different operating states of the individual pane, in each case the time period spent in the respective operating state is accumulated. An aging value describing the state of aging can then be formed from the respective accumulated time periods. The operating states that are recorded may for example comprise the setting of the maximum transmittance and the setting of the minimum transmittance. A mathematical specification for determining an aging value from the described time periods is known for example for the case of a capacitor from the technical article by Endicott et al. (referred to hereinafter as [Endicott 1965])(H. S. Endicott, B. D. Hatch, R. G. Sohmer, "Application of the Eyring Model to Capacitor Aging Data", IEEE Transactions on Component Parts, pages 34 to 41, March 1965). The disclosure is based here on the realization that such a model can also be successfully applied to a switchable individual pane. The analyzer may be designed here on the basis of a program module, for example for a microcontroller of the control device.

A further possibility of determining the state of aging is that, in the case of the respective individual pane, a respective impedance value for at least two different operating states of the individual pane is recorded by the analyzer of the control device. The two operating states may be for example the minimum transmittance and the maximum transmittance. On the basis of a difference or a ratio (quotient) of the two impedance values, an aging value describing the state of aging is then formed.

It is generally preferably provided that, for the at least two operating states, the impedance value is measured by means of an AC voltage. One of the impedance values is measured at a frequency f of the AC voltage of a period (1/f) greater than the initially described time constant $\tau$ of particles of an electrochromic suspension of the respective individual pane. The other of the impedance values is measured at a frequency f of the AC voltage of a period less than the time constant $\tau$ of the particles. In particular, there is a ratio of the period to the time constant that is greater than 3 and less than ⅓.

One development provides that the state data of the individual panes indicate in each case a temperature at the time of the respective individual pane determined by a temperature recording unit and the configurations for the actuation signals of the individual panes are set on the basis of a temperature characteristic of the individual panes (temperature-dependent transmittance characteristic). So if a desired transmittance value is prescribed for the transmittance and the temperature at the time of an individual pane is determined, the configuration of the actuation signal for setting this desired transmittance value or a variation over time for achieving the same can be determined by means of the temperature-dependent transmittance characteristic. The temperature-dependent transmittance characteristic may for example be a characteristic curve or a characteristic map. The temperature-dependent transmittance characteristic may be determined on the basis of a series of tests.

The temperature of an individual pane may for example be determined by means of a respective temperature sensor. It is preferably provided, however, that the temperature recording unit is formed by the control device itself for indirect temperature recording, in that the control device records an electrical impedance of the respective individual pane and determines the temperature at the time of the individual pane in dependence on the electrical impedance recorded. This embodiment is based on the realization that it is possible for example by means of a series of tests to provide an assignment specification, for example a table, by means of which the value of the electrical impedance can in each case be assigned a temperature value. The impedance measurement may for example take place by means of a measuring signal, which can be applied like an actuation signal to the respective individual pane. The impedance measurement may for example comprise a sinusoidal electrical excitation, so that there is a monofrequency AC voltage at the individual pane. By determining the absolute amount and phase of the electrical current obtained, the impedance can be determined in a way known per se.

One development provides that the state data of the individual panes indicate in each case a transmittance at the time that is measured on the respective individual pane by a photo measuring unit or a photo sensor. A feedback control is therefore carried out, in which it is checked by the photo measuring unit whether the respective individual pane actually has or assumes the transmittance value prescribed at the particular time. Otherwise, a control error is detected and the configuration for the actuation signal of this individual pane is adapted or changed. If an individual pane has reached its maximum transmittance or its minimum transmittance, and therefore no longer responds to the actuation signal, the entire switching operation is stopped. Using measuring instruments for monitoring each transmittance value at the particular time means that it is not necessary to know or provide a characteristic curve of the transmittance characteristic at the time of the individual panes. There is also the advantage that the transmittance value of each individual pane is adapted by way of the actuation signals or is kept at the prescribed desired transmittance value permanently, that is to say even in the case of interim heating up or cooling down of an individual pane, so that a change in state of an individual pane does not have an effect on its transmittance value.

To carry out a method according to the disclosure, a control device for controlling the assembly comprising multiple switchable electrochromic panes is provided by the disclosure. The control device has a computation unit, which is configured to carry out an embodiment of the method according to the disclosure. The computation unit may for example be formed on the basis of a microcontroller or a control logic (for example an ASIC, Application-Specific Integrated Circuit).

The disclosed subject matter is suitable for use in buildings. In addition, the disclosed subject matter may also be implemented in a motor vehicle. Correspondingly, the subject matter of the disclosure also comprises in an example a motor vehicle with multiple switchable electrochromic individual panes and with an embodiment of the control device according to the disclosure.

The individual panes may consequently be operated in the motor vehicle as an assembly.

In an exemplary embodiment, the described components of the embodiment each represent individual features of the disclosure which are to be considered independently of one another and which each also develop the disclosed subject matter independently of one another and can therefore also be considered to be a component of the disclosure, either individually or in a combination other than that shown. Furthermore, further features of the disclosed subject matter which have already been described can also be added to the described embodiment.

In the figures, functionally identical elements are in each case provided with the same reference signs.

FIG. 1 shows an assembly 10 comprising multiple switchable electrochromic individual panes 11, two of which are represented by way of example, and it is indicated by omission points 12 that still more individual panes 11 may be provided. Altogether, N individual panes may be provided. The assembly 10 may for example be fitted in a motor vehicle 13, for example an individual pane 11 may represent a roof window and one or more individual panes 11 may in each case represent a window pane.

At the individual panes 11, a degree of transmittance or a transmittance value can be set in each case. In order to set the transmittance value in the case of an individual pane 11, an actuation signal U1 to UN has to be set in each case for each individual pane 11, where 1 to N is the respective index or the respective serial number of an individual pane 11. Hereinafter, an individual actuation signal is generally referred to as actuation signal U, without the index 1 or N. Each actuation signal U is in each case an electric voltage signal. The respective actuation signal U may be generated by a control device 14, which for this purpose may for example comprise a microcontroller or a control logic. The control device 14 may be prescribed a desired transmittance D. For example, a user may set which transmittance value he desires in the case of the individual panes 11. For this purpose, an operator control unit (not shown) for setting the desired transmittance D may be provided.

However, a respective configuration of the actuation signal U may be set differently in the case of the individual panes 11, since, for setting the desired transmittance D, it may be taken into account that a transmittance characteristic of the individual panes 11 may differ, for example because of a different age or amount of wear or because of a different temperature.

Figure 2:
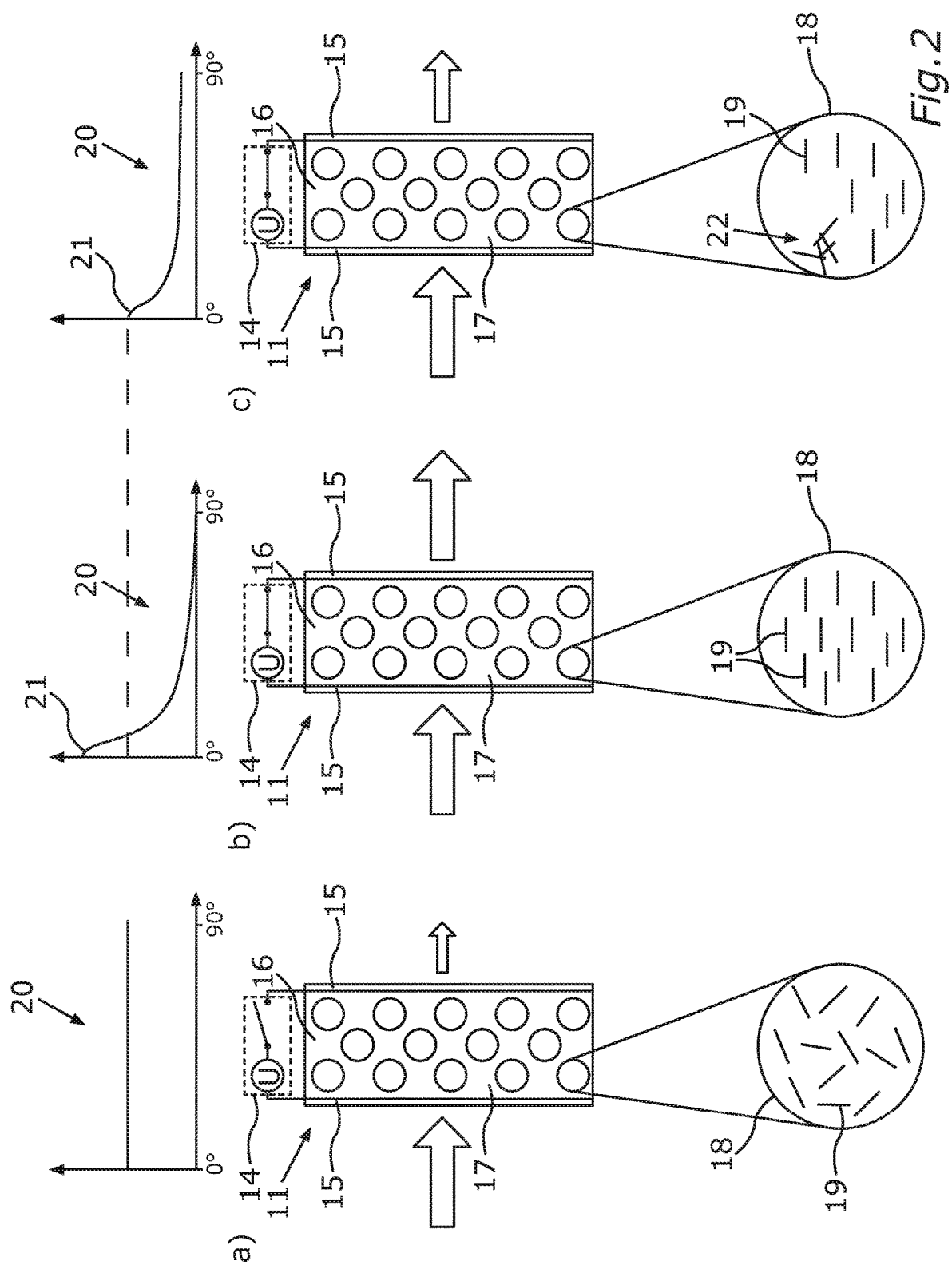
FIG. 2 shows a diagram for illustrating different switching states and states of aging of an individual pane of the assembly.

The difference in the transmittance characteristic caused by differences in age is illustrated in FIG. 2. Incident and penetrating light is represented in each case by hollow arrows, the size of which corresponds to the amount of light. FIG. 2 shows in a representation (a) an individual pane 11 with a set minimum transmittance. The actuation signal U has been switched off, that is to say there is no electrical voltage supplied at electrically conductive, transparent contact layers 15. The contact layers 15 may for example be formed on the basis of indium tin oxide (ITO). Between the contact layers 15 there is the actual electrochromic layer 16 of the individual pane 11. The electrochromic layer 16 may comprise in a known way a carrier matrix 17, and enclosed therein, suspensions 18 with particles 19. A spatial alignment of the particles 19 in the case of an actuation signal U=0 Volt (actuation voltage U switched off) is illustrated as a probability density function 20 (probability distribution) for different relative angles between the electrical field and the particles. It is in this case a uniform distribution.

It is shown in the representation (b) how an actuation signal U with which a maximum transparency or maximum transmittance is achieved is generated by switching on an actuation voltage. In the case of an unaged or new or unworn individual pane 11, a maximum alignment is possible for the particles 19 in dependence on the electrical field formed between the contact layers 15. The probability density function 20 shows a mode 21 (maximum) for a preferred alignment angle of 0 degrees.

The representation (c) illustrates the same switching state as in representation (b), but in the case of an aged individual pane 11. On account of a clumping or agglomeration 22 of particles 19, not all of the particles 19 can align themselves along the preferred alignment of 0 degrees, although the actuation signal U corresponds to the corresponding actuation voltage between the contact layers as in representation (b). Correspondingly, the mode 21 is less pronounced in the probability density function 20 than in the case of the as-new individual pane in representation (b). The maximum transmittance of the aged individual pane 11 according to representation (c) is consequently lower than in the case of the as-new individual pane according to representation (b).

Figure 3:
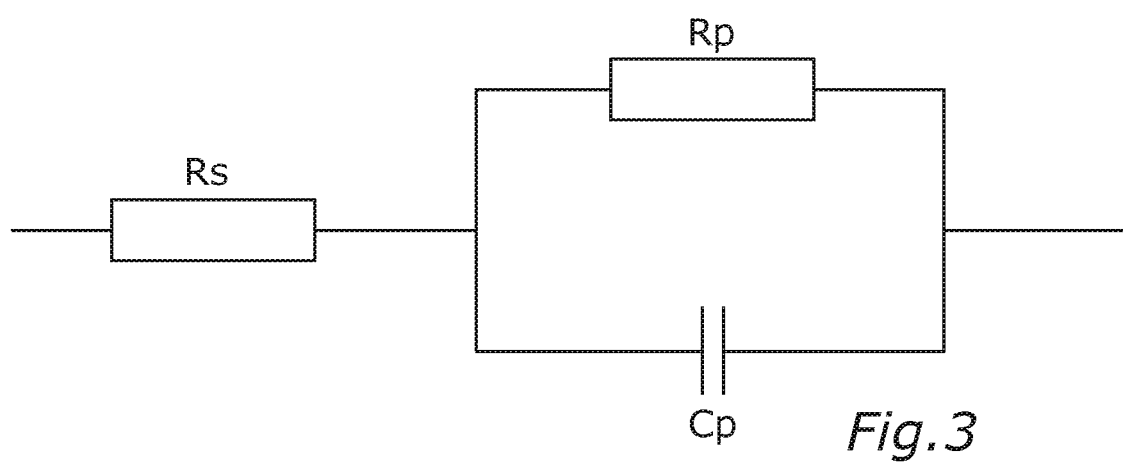
FIG. 3 shows an equivalent circuit diagram for deriving a transmittance characteristic in dependence on the state of aging.

FIG. 3 illustrates an equivalent circuit diagram by means of which the electrical behavior of an individual pane 11 can be modelled or replicated. The contact layers 15 have a series resistance Rs. As a result of the arrangement comprising contact layers 15 and an electrochromic layer 16 as a dielectric with a leakage current, a parallel circuit comprising a parallel resistor Rp and a capacitance Cp is obtained as a model.

The control device 14 can take into account the different state of aging and also a different temperature behavior of the individual panes 11 when setting the configuration of the individual actuation signals U1 to UN. On this basis, each individual pane 11 can be set to the same transmittance value.

For this purpose, a respective temperature T of the individual panes 11 can be determined. In addition, according for example to the equivalent circuit diagram of FIG. 3, an impedance Z1 to ZN of the respective individual pane 11 can be determined (1 to N is again the index of the individual panes). Hereinafter, the impedance Z of an individual pane is given without the index 1 to N. As FIG. 1 shows, the respective actuation signal U can consequently be set as a function of Z, a frequency f, the temperature T, the desired transmittance D and a time profile over the time t. The impedance Z and the temperature T in this case represent state data in the sense of the disclosure.

In order to make all of the individual panes 11 of the assembly 10 appear optically equivalent or the same, it is consequently possible to determine or ascertain the temperature T and the state of aging A individually for each individual pane 11, and, derived from that, to adapt the configuration of the actuation signal U individually for each individual pane 11.

In principle, two procedures are possible, based on
1) a direct measurement of the transmittance or
2) by indirect determination of the actuation curve, that is to say the actuation signal U.

The direct measurement may be implemented with the aid of a light sensor, which measures the intensity of the light that in each case passes through the switchable individual pane 11. With this intensity as an input variable, the control device 14 can then adapt the transmittance of the individual pane 11 with the aid of a control algorithm so as to obtain a prescribed intensity value, which can be derived or determined from the desired transmittance D. The intensity value may be prescribed for the individual pane 11 or for the assembly 10 of the individual panes 11. In the case of the assembly 10 of the individual panes 11, which are intended to appear with the same transmittance, the individual pane 11 with the smallest maximum transmittance prescribes the maximum transmittance for the entire assembly 10. Equally, the pane with the greatest minimum transmittance prescribes the minimum transmittance for the entire assembly 10.

In the case of indirect determination, the impedance Z of the switchable individual pane 11, that is to say of the film or electrochromic layer 16, can be recorded by the control device 14. It can be used for calculating the equivalent circuit diagram variables Rs, Rp, Cp for the equivalent circuit diagram according to FIG. 3. This is however just an equivalent circuit that is given by way of example. For example in the case of sinusoidal electrical excitation of the individual pane 11 by means of a corresponding actuation signal, the determination of the impedance Z may take place by measuring the absolute amount and phase of the voltage and current. It should be noted here that not only the aging A, that is to say the aging value A, of the switchable individual pane 11 but also the temperature T, the switching frequency f for the AC voltage, the type of signal (for example square-wave, trapezoidal-wave or sine-wave voltage) and the voltage value V have an influence on the value of Z. In order to isolate the influence of the aging A from the other variables, these variables are preferably recorded or estimated. Operating and switching cycles with the respective temperatures T, frequencies f and voltages V may be recorded. The frequency f, the type of signal and the voltage V are prescribed by the control device 14, and are consequently known. The temperature T may be measured with a temperature probe or temperature sensor or in turn be extracted from the impedance Z itself in the way described.

In order to quantify the aging A of the switchable individual pane 11, that is to say determine the aging value A, at least two approaches are possible, referred to here as variants i and ii.

(i): The state of aging of the switchable individual pane is continuously calculated from the influencing variables temperature T, voltage V, frequency f, number n and type of load cycles with the aid of a model. Various models may be used to record the aging value A of the switchable individual pane 11. An established model in connection with the aging of capacitances is for example the Eyring model [Endicott 1965]. In this case, the state of aging is quantified in the form of the aging value A. The individual aging processes $A_i$ are in this case summated to form an overall state of aging value A.

$$A = \sum_n A_i$$

$$A_i = \frac{1}{\tau_i} \Delta t_i$$

$$\frac{1}{\tau_i} = a T_i^\alpha e^{\frac{-E_a}{kT_i}} V_i^{\left(b + \frac{c}{T_i}\right)}$$

n number of possible operating states
i index of the operating state
$\Delta t_i$ duration of the operating state
$T_i$ temperature of the operating state
$V_i$ voltage of the operating state
$E_a$ activation energy of the aging process
k Boltzmann constant
α, a, b, c model parameters (to be determined in tests)

(ii) The state of aging A of the active particles 19 is determined from the measurement of the impedance Z under different conditions (for example different burst length or pulse width of a pulse-width-modulated actuation signal U). In the case of this method, the contribution of the particles 19 in the suspension to the overall capacitance is determined. Cstationary=f(Cmatrix, Cparticle), with a function f( . . . ), which represents an adequate equivalent circuit diagram of the dielectric matrix 17 (Cmatrix) and of the particles 19 (Cparticle) in suspension (for example parallel circuit: Cstationary=Cmatrix+Cparticle or series circuit 1/Cstationary=1/Cmatrix+1/Cparticle). The degree of alignment in this case determines the Cparticle contribution. The more the particles 19 are aligned in the electrical field, the greater their contribution to the capacitance. By pulsed measurements in the dark (non-aligned) state and measurements with high stationary excitation (greatly aligned), the Cparticle contribution can be determined. For this purpose, one or more short pulses ($t_{pulse} \ll \tau$) are applied in the dark state at a fixed frequency f of the excitation and the impedance Z is measured. This results in the common capacitance Cmatrix of the dielectric matrix and the particles in chaotic alignment (FIG. 2, representation a). In comparison with this, a stationary measurement produces the capacitance Cstationary of the dielectric matrix and the particles in alignment parallel to the electrical field (FIG. 2, representations b and c). It is generally the case that: Cstationary>Cmatrix.

An aging (for example clustering, bonding together, agglomeration 22) of the particles 19 in this case brings about a smaller Cparticle contribution. The proportion of the particles 19 that cannot any longer be freely aligned in the electrical field can be estimated from the profile or the development of Cparticle over time, as is shown in FIG. 2, representation (c).

This results in a maximum degree of transmission that can still be achieved (see FIG. 2: Schematic representation of the particle alignment in the switchable glazing/individual pane. In FIG. 2, in this respect the probability distribution functions 20 of the particle alignment relative to the electrical field are sketched: (a) deenergized state, (b) state of greatest alignment before aging, (c) state of greatest alignment in the aged state).

In order to compensate for the aging and temperature of the switchable glazing/individual pane 11, the following procedure is used: The transmittance characteristic or actuation characteristic curve (transmittance as a function of the applied voltage) is calculated for each individual pane 11 from the state of aging A and the temperature T of the individual panes with the aid of an algorithm (see FIG. 1: Concept of impedance measuring and actuation). Taking into account the actuation characteristic curve for each individual pane, it can be achieved that all of the panes (individual panes 11) uniformly have the prescribed transmittance D. It applies in this case that the glazing/individual pane with the smallest maximum (greatest minimum) transmittance prescribes the maximum (minimum) transmittance for the assembly of panes under consideration.

The aging A and temperature T of switchable glazings/ individual panes influence their transmittance characteristic. In an assembly 10 comprising multiple panes (individual panes 11), as for example in a vehicle 13, optical differences between the panes may therefore occur if there is no compensation for the aging A and temperature T of the individual panes 11.

The described technical features provide methods for determining the state of aging A and the temperature T of the individual switchable glazings/individual panes 11, calculating the transmittance characteristic and, by a configuration derived therefrom, making all of the individual panes 11 in an assembly 10 appear with the same prescribed degree of transmission D. The advantage that is obtained is uniform appearance of the assembly 10 of individual panes.

Overall, the example shows how compensation for aging effects and temperature in the case of switchable glazings can be provided by means of the disclosed subject matter.

The invention claimed is:

1. A method for controlling an assembly comprising multiple individual switchable electrochromic panes by setting a transmittance for each of the individual panes individually by a respective electrical actuation signal, comprising:
   at a control device, recording respective state data of each individual pane at a time, and
   establishing a configuration of the respective actuation signal for each individual pane on the basis of the state data,
   wherein the configurations of the actuation signals are made to match one another in such a way that the individual panes have the same transmittance value;
   wherein the state data of the individual panes indicate in each case a state of aging of the respective individual pane at the time, determined by an analyzer of the control device, and the configurations are determined on the basis of a predetermined aging model, which indicates for a given state of aging a transmittance characteristic of the individual pane; and
   wherein, in the case of the respective individual pane, a respective impedance value for at least two different operating states of the individual pane is recorded by the analyzer and, on the basis of a difference or a ratio of the impedance values, an aging value describing the state of aging is formed.

2. The method as claimed in claim 1, wherein limits comprise at least one of a smallest maximum transmittance and a greatest minimum transmittance of the individual panes is determined on the basis of the state data and the respective transmittance of each individual pane of the other individual panes is limited to the limits by the configuration of the respective actuation signal.

3. The method as claimed in claim 1, wherein a change over time in the transmittance values of the individual panes is maintained during a switching operation by making the configurations match.

4. The method as claimed in claim 1, wherein an aging process of the respective individual pane is replicated by the analyzer, in that, for different operating states of the individual pane, in each case the time period spent in the respective operating state is accumulated and an aging value describing the state of aging is formed from them.

5. The method as claimed in claim 1, wherein, for the at least two operating states, the impedance value is measured by means of an AC voltage and one of the impedance values is measured at a frequency of the AC voltage of a period greater than a time constant of particles of an electrochromic suspension of the respective individual pane, and another of the impedance values is measured at a frequency of the AC voltage of a period less than the time constant of the particles.

6. The method as claimed in claim 1, wherein the state data of the individual panes indicate in each case a temperature at the time of the respective individual pane determined by a temperature recording unit and the configurations are set on the basis of a temperature characteristic of the individual panes.

7. The method as claimed in claim 6, wherein the temperature recording unit is provided by the control device, in that the control device records an electrical impedance of the respective individual pane and determines the temperature at the time of the individual pane in dependence on the electrical impedance recorded.

8. The method as claimed in claim 1, wherein the state data of the individual panes indicate in each case a transmittance at the time that is measured on the respective individual pane by a photo measuring unit.

9. A control device for controlling an assembly comprising multiple switchable electrochromic individual panes, the control device comprising a computation unit configured to carry out the method as claimed in claim 1.

10. A motor vehicle comprising multiple switchable electrochromic individual panes and the control device as claimed in claim 9.

11. A method for controlling an assembly comprising multiple individual switchable electrochromic panes by setting a transmittance for each of the individual panes individually by a respective electrical actuation signal, comprising: at a control device, recording respective state data of each individual pane at a time, and establishing a configuration of the respective actuation signal for each individual pane on the basis of the state data, wherein the configurations of the actuation signals are made to match one another in such a way that the individual panes have the same transmittance value; wherein the state data of the individual panes indicate in each case a state of aging of the respective individual pane at the time, determined by an analyzer of the control device, and the configurations are determined on the basis of a predetermined aging model, which indicates for a given state of aging a transmittance characteristic of the individual pane; and wherein an aging process of the respective individual pane is replicated by the analyzer, in that, for different operating states of the individual pane, in each case the time period spent in the respective operating state is accumulated and an aging value describing the state of aging is formed from them; wherein, in the case of the respective individual pane, a respective impedance value for at least two different operating states of the individual pane is recorded by the analyzer and, on the basis of a difference or a ratio of the impedance values, an aging value describing the state of aging is formed; and wherein, for the at least two operating states, the impedance value is measured by means of an AC voltage and one of the impedance values is measured at a frequency of the AC voltage of a period greater than a time constant of particles of an electrochromic suspension of the respective individual pane, and another of the impedance values is measured at a frequency of the AC voltage of a period less than the time constant of the particles.

12. The method as claimed in claim 11, wherein the state data of the individual panes indicate in each case a temperature at the time of the respective individual pane determined by a temperature recording unit and the configurations are set on the basis of a temperature characteristic of the individual panes.

13. The method as claimed in claim 11, wherein the temperature recording unit is provided by the control device, in that the control device records an electrical impedance of the respective individual pane and determines the temperature at the time of the individual pane in dependence on the electrical impedance recorded.

14. The method as claimed in claim 11, wherein the state data of the individual panes indicate in each case a transmittance at the time that is measured on the respective individual pane by a photo measuring unit.

15. A control device for controlling an assembly comprising multiple switchable electrochromic individual panes, the control device comprising a computation unit configured to carry out the method as claimed in claim 11.

16. A motor vehicle comprising multiple switchable electrochromic individual panes and the control device as claimed in claim 15.

* * * * *